US011999151B2

(12) United States Patent
Tsai

(10) Patent No.: US 11,999,151 B2
(45) Date of Patent: Jun. 4, 2024

(54) COMPOSITE STRUCTURES CONTAINING FINITE LENGTH TAPES AND METHODS FOR MANUFACTURING AND USING THE SAME

(71) Applicant: The Board of Trustees of the Leland Stanford Junior University, Stanford, CA (US)

(72) Inventor: Stephen W. Tsai, Honolulu, HI (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 90 days.

(21) Appl. No.: 17/618,680

(22) PCT Filed: Jun. 11, 2020

(86) PCT No.: PCT/US2020/037171
§ 371 (c)(1),
(2) Date: Dec. 13, 2021

(87) PCT Pub. No.: WO2020/252126
PCT Pub. Date: Dec. 17, 2020

(65) Prior Publication Data
US 2022/0242087 A1    Aug. 4, 2022

Related U.S. Application Data

(60) Provisional application No. 62/861,060, filed on Jun. 13, 2019.

(51) Int. Cl.
*B32B 3/10*    (2006.01)
*B29C 70/10*   (2006.01)
(Continued)

(52) U.S. Cl.
CPC ............. *B32B 5/12* (2013.01); *B29C 70/10* (2013.01); *B29C 70/30* (2013.01); *B29C 70/386* (2013.01);
(Continued)

(58) Field of Classification Search
None
See application file for complete search history.

(56) References Cited

U.S. PATENT DOCUMENTS 4,012,549 A * 3/1977 Slysh ..................... E04C 2/38
52/630
4,063,981 A * 12/1977 Rhodes .................. E04C 2/22
428/116
(Continued)

FOREIGN PATENT DOCUMENTS

CN    105196563 A  * 12/2015
CN    109353027 A  *  2/2019
(Continued)

OTHER PUBLICATIONS

Machine Translation of CN-105196563-A, Dec. 2015 (Year: 2015).*
(Continued)

*Primary Examiner* — Jeffrey A Vonch
(74) *Attorney, Agent, or Firm* — Alston & Bird LLP

(57) ABSTRACT

Described are composite grid structures that have a plurality of ply layers, each one of the plurality of ply layers comprising a plurality of first elongate tapes oriented in a first direction and a plurality of second elongate tapes oriented in a second direction, the second direction being offset from the first direction by an angle of at least 25 degrees. In the grid structures: each of the first elongate tapes has a first length extending between opposing ends of each of the plurality of first elongate tapes and a first midpoint intermediate the opposing ends, and each of the second elongate tapes has a
(Continued)

second length extending between opposing ends of each of the plurality of second elongate tapes and a second midpoint intermediate the opposing ends. Associated composite laminate structures, grid structures, and methods of manufacturing and/or using the same are also disclosed.

24 Claims, 11 Drawing Sheets

(51) Int. Cl.
    *B29C 70/20* (2006.01)
    *B29C 70/30* (2006.01)
    *B29C 70/38* (2006.01)
    *B29D 24/00* (2006.01)
    *B32B 3/12* (2006.01)
    *B32B 3/14* (2006.01)
    *B32B 3/18* (2006.01)
    *B32B 3/26* (2006.01)
    *B32B 3/30* (2006.01)
    *B32B 5/02* (2006.01)
    *B32B 5/12* (2006.01)
    *B32B 5/26* (2006.01)
    *B32B 5/28* (2006.01)
    *B64C 1/06* (2006.01)
    *B64C 1/12* (2006.01)
    *B64C 3/18* (2006.01)
    *B64C 3/26* (2006.01)
    *B29D 99/00* (2010.01)
    *B29L 31/30* (2006.01)
    *B32B 7/03* (2019.01)

(52) U.S. Cl.
    CPC .............. *B29D 24/005* (2013.01); *B32B 3/10* (2013.01); *B32B 3/14* (2013.01); *B32B 3/18* (2013.01); *B32B 3/266* (2013.01); *B32B 3/30* (2013.01); *B32B 5/028* (2013.01); *B32B 5/26* (2013.01); *B29C 70/202* (2013.01); *B29C 70/207* (2013.01); *B29D 99/0014* (2013.01); *B29L 2031/3076* (2013.01); *B29L 2031/3082* (2013.01); *B29L 2031/3085* (2013.01); *B32B 3/12* (2013.01); *B32B 7/03* (2019.01); *B32B 2260/021* (2013.01); *B32B 2260/046* (2013.01); *B32B 2262/106* (2013.01); *B32B 2262/16* (2021.05); *B32B 2307/50* (2013.01); *B64C 1/064* (2013.01); *B64C 1/12* (2013.01); *B64C 3/187* (2013.01); *B64C 3/26* (2013.01); *Y02T 50/40* (2013.01); *Y10T 428/24058* (2015.01); *Y10T 428/24091* (2015.01); *Y10T 428/24124* (2015.01); *Y10T 428/24149* (2015.01); *Y10T 428/24182* (2015.01); *Y10T 428/24562* (2015.01); *Y10T 428/2457* (2015.01); *Y10T 428/2476* (2015.01); *Y10T 428/249941* (2015.04); *Y10T 428/249952* (2015.04); *Y10T 428/249995* (2015.04)

(56) References Cited

U.S. PATENT DOCUMENTS

| | | | |
|---|---|---|---|
| 5,429,845 A | 7/1995 | Newhouse et al. | |
| 5,476,189 A | 12/1995 | Duvall et al. | |
| 6,050,315 A * | 4/2000 | Deckers ................ | B29C 70/16 156/499 |
| 9,296,174 B2 | 3/2016 | Tsai et al. | |
| 11,446,897 B2 | 9/2022 | Tsai et al. | |
| 2006/0093802 A1 | 5/2006 | Tsai et al. | |
| 2006/0116040 A1 * | 6/2006 | Yun ........................ | D04H 3/04 442/49 |
| 2007/0187024 A1 * | 8/2007 | Johnson ................ | B29C 70/386 156/360 |
| 2009/0011175 A1 * | 1/2009 | Sekine .................. | B29C 70/202 428/113 |
| 2011/0103965 A1 * | 5/2011 | Mathew ................ | F03D 1/0675 416/233 |
| 2012/0100343 A1 * | 4/2012 | Borghini-Lilli ......... | B29C 70/30 428/156 |
| 2012/0177872 A1 | 7/2012 | Tsai et al. | |
| 2013/0337207 A1 * | 12/2013 | Mueller ................ | B29C 70/326 156/196 |
| 2014/0049814 A1 * | 2/2014 | Sekine .................... | G02B 5/09 428/36.9 |
| 2014/0170371 A1 | 6/2014 | Kamiya et al. | |
| 2015/0030805 A1 * | 1/2015 | Tsai ...................... | B29C 70/202 428/110 |
| 2015/0030806 A1 * | 1/2015 | Fink .......................... | B32B 3/12 428/116 |
| 2015/0175250 A1 * | 6/2015 | Deobald ................ | B64C 1/064 156/257 |
| 2017/0369148 A1 * | 12/2017 | De Grosbois ......... | B29C 70/887 |
| 2018/0272645 A1 * | 9/2018 | Pavlov .................... | B32B 3/06 |
| 2021/0114336 A1 | 4/2021 | Tsai et al. | |
| 2022/0161914 A1 * | 5/2022 | Kawamata ............... | B64F 5/10 |
| 2022/0297407 A1 | 9/2022 | Tsai et al. | |
| 2022/0363019 A1 | 11/2022 | Tsai et al. | |

FOREIGN PATENT DOCUMENTS

| | | | | |
|---|---|---|---|---|
| DE | 102011121639 A1 * | 6/2013 | ............ | B29C 70/22 |
| EP | 2772351 A1 | 9/2014 | | |
| EP | 2830042 A1 | 1/2015 | | |
| EP | 2663450 B1 | 7/2018 | | |
| WO | WO 2018/181983 A1 | 10/2018 | | |
| WO | WO 2018/187186 A1 | 10/2018 | | |
| WO | WO 2020/252126 A1 | 12/2020 | | |

OTHER PUBLICATIONS

Nijhuis et al., Automated Manufacture of Grid Stiffened Panels, Jun. 11, 2019, European Conference of Multifunctional Structures, Report No. NLR-TP-2019-288 (Year: 2019).*
U.S. Appl. No. 16/500,337, Notice of Allowance mailed May 11, 2022.
Akbulut, et al., "Optimum design of composit laminates for minimum thickness," computer and Structures, 86, 1974-1982, (2008).
An, et al., "Stacking sequence optimization and blending design of laminated composite structures," Structural and Mulitdisciplinary Optimization, published online Nov. 28, 2018, doi.org/10.1007/s00158-018-2158-1.
Chen et al., "Optimal design of composite laminates for minimizing delamination stresses by particle swarm optimization combined with FEM," Structural Engineering and Mechanics, vol. 31, No. 4, 407-421, (2009).
Hühne, C. et al. Robust Design Of Composite Cylindrical Shells Under Axial Compression—Simulation and Validation, Thin-Walled Structures, Issue 46, (2008), pp. 947-962.
Khot, N.S. On The Influence Of Initial Geometric Imperfections On The Buckling and Postbuckling Behavior Of Fiber-Reinforced Cylindrical Shells Under Uniform Axial Compression, Technical Report AFFDL-TR-68-136, Oct. 1968, (69 pages), Air Force Flight Dynamics Laboratory Wright-Patterson Air Force Base, Ohio.
Zhang, et al., "Winding orientation optimization design of composite tubes based on quasi-static and dynamic experiments," Thin-Walled Structures, 127, 425-433, (2018).
U.S. Appl. No. 16/500,337, Non-Final Office Action mailed May 13, 2021.
U.S. Appl. No. 16/500,337, Requirement for Restriction/Election mailed Jan. 26, 2021.
U.S. Appl. No. 16/500,337, Non-Final Office Action mailed Nov. 12, 2021.

(56) References Cited

OTHER PUBLICATIONS

WIPO Application No. PCT/US2018/025600, PCT International Preliminary Report on Patentability mailed Oct. 8, 2019.
WIPO Application No. PCT/US2018/025600, PCT International Search Report and Written Opinion of the International Searching Authority mailed Jul. 17, 2018.
WIPO Application No. PCT/US2020/037171, PCT International Search Report and Written Opinion of the International Searching Authority mailed Sep. 18, 2020.

* cited by examiner

DOUBLE-DOUBLE FIELD [±ψ]

| $A_{11}^*$ [±Φ] | 0 | 10 | 20 | 30 | 40 | 50 | 60 | 70 | 80 | 90 |
|---|---|---|---|---|---|---|---|---|---|---|
| 0 | 0.885 | 0.861 | 0.796 | 0.708 | 0.618 | 0.546 | 0.500 | 0.477 | 0.470 | 0.469 |
| 10 | 0.861 | 0.837 | 0.772 | 0.684 | 0.594 | 0.522 | 0.476 | 0.453 | 0.446 | 0.445 |
| 20 | 0.796 | 0.772 | 0.707 | 0.618 | 0.529 | 0.457 | 0.410 | 0.388 | 0.381 | 0.380 |
| 30 | 0.708 | 0.684 | 0.618 | 0.530 | 0.441 | 0.368 | 0.322 | 0.300 | 0.293 | 0.292 |
| 40 | 0.618 | 0.594 | 0.529 | 0.441 | 0.351 | 0.279 | 0.233 | 0.210 | 0.203 | 0.202 |
| 50 | 0.546 | 0.522 | 0.457 | 0.368 | 0.279 | 0.207 | 0.160 | 0.138 | 0.131 | 0.130 |
| 60 | 0.500 | 0.476 | 0.410 | 0.322 | 0.233 | 0.160 | 0.114 | 0.092 | 0.085 | 0.084 |
| 70 | 0.477 | 0.453 | 0.388 | 0.300 | 0.210 | 0.138 | 0.092 | 0.069 | 0.062 | 0.061 |
| 80 | 0.470 | 0.446 | 0.381 | 0.293 | 0.203 | 0.131 | 0.085 | 0.062 | 0.055 | 0.054 |
| 90 | 0.469 | 0.445 | 0.380 | 0.292 | 0.202 | 0.130 | 0.084 | 0.061 | 0.054 | 0.053 |

COMPOSITE STRUCTURES CONTAINING FINITE LENGTH TAPES AND METHODS FOR MANUFACTURING AND USING THE SAME

CROSS-REFERENCE TO RELATED APPLICATIONS

This application claims priority to and the benefit of U.S. Provisional Patent Application Ser. No. 62/861,060, filed Jun. 13, 2019; the contents of which as are hereby incorporated by reference in their entirety.

BACKGROUND

Technical Field

Various embodiments of the present invention relate generally to composite laminate structures, in particular combinations of grid, core, and/or skin structures formed from staggered discontinuous tape portions having finite predetermined or engineered lengths, together with methods of manufacturing, producing, and using such structures.

Description of Related Art

To enhance acceptance, conventional composite laminate structures were generally designed to emulate the strength characteristics of conventional metal-based laminate materials and as such are constrained to designs having layers of plies that are both symmetrical and balanced. Such conventional structures, when so constrained and containing at least three ply layers formed from black carbon fibers, were commonly referred to in the art as "black aluminum" due to their combined carbon makeup and metal-emulating characteristics. Additional details surrounding conventional composite laminate structures may be understood with reference to US Publication No. 2006/0093802, the contents of which as are hereby incorporated herein by reference in their entirety.

These conventional composite laminate structures oftentimes utilized "legacy quad laminates" (as commonly referred to), which involve laminates made of collections of [0], [±45] and [90] plies (see e.g., legacy quad field 1, illustrated in FIGS. 1A-1B). When one each of the layers is stacked, the resulting structure is quasi-isotropic because it matches the isotropic properties of aluminum, which informs one of the reasons for calling such composite laminate black aluminum. The legacy quad laminates were always discrete in nature, meaning a limited number of ply angles and/or ply angle combinations (of multiple layers of the four discrete plies, as listed above) could be chosen. To have desired directional properties, more plies than the quasi-isotropic made of four plies had to be added, leading to 6, 8, 10 or more plies of sub-laminates (as detailed elsewhere herein). When laminates are made with mid-plane symmetry, resulting total laminates have doubled thickness of 12, 16, and 20 plies. If thicker laminates are needed, multiples of 12, 16, and 20 had to be considered.

In extreme cases, laminates are selected based on total laminate without use of sub-laminates. In such cases, the total laminate may be selected based on the percentages of 0°, ±45° and 90° with plies dispersed across the thickness. Only explicit requirements in such cases are mid-plane symmetry and a limit of three on ply groupings (i.e., there are four plies, but they're provided in three groups, namely 0°, ±45° and 90°). For instance, if a sub-laminate has 10 layers, with five of them being 0°, the 0° plies may be separated into at least two groupings, namely a set of three and a set of two plies. Three or more groups such as three 1-ply and one 2-ply could be provided but having groups of four and one—or five all in one group—is not feasible for adhering to restrictive stacking sequences required for conventional legacy quad family of laminates.

The above is a unique issue with the legacy quad family of laminates. First, the sub-laminates are thick, secondly, mid-plane symmetry is required, and, lastly, huge jump in laminate thickness as thick sub-laminates are added. The huge jump can be mitigated by adding some chosen plies not part of the repeated sub-laminates. But such arbitrarily added plies, in thickness less than 6, 8, or 10 plies, differ from the properties of the sub-laminates and make optimization practically impossible. There is also an issue on minimum gauge. Many components and devices require laminate thickness less than 12, 16, and 20 plies. The use of legacy quad composites is thus not feasible in those contexts, such as for example in the realm of fuselage or wing skins. Sub-laminates of this nature were also delamination prone, and multiple failure modes resulting from thousands of fiber discontinuities and matrix cracking and ply delamination. Complex procedures to blend adjacent laminates with different stacking and thickness, and to drop or add plies are required for a complex structure and impede optimization and manufacturing.

Inefficiencies arose in conventional composite laminate structures due to their discrete nature, exacerbated by self-inflicted constraints in the industry, including a perceived requirement that all composite laminate structures—and in particular the sub-laminate structures therein—have balanced and symmetric material characteristics; stated otherwise, they involve necessarily thick sub-laminate structures and mid-plane symmetry. Specifically, symmetric laminates involve a reflective or mirror-image equivalence of ply orientation about their mid-plane, while balanced laminates involve an equal number of positively (+) and negatively (−) oriented plies across their entirety. Such constraints have historically largely remained unchallenged due to concerns that conventional composite laminated structures will undesirably warp upon cool down from a curing temperature or increased residual stress when the operating temperature changes. For example, to enforce symmetry, a minimum number of plies must be doubled leading to 12, 16, and 20 plies, or higher multiples like 24, 32 and 40, and beyond. Additional details surrounding conventionally imposed constraints may be understood with reference to U.S. Pat. No. 9,296,174, the contents of which as are hereby incorporated herein by reference in their entirety.

Symmetric laminates have been traditionally formed by stacking the multiple layers of various unidirectional plies in such a manner that the composite laminate exhibits a mirror-image of itself about a mid-plane of the structure. Such lamination processes are generally time and labor intensive as well as being prone to error, requiring special attention to ensure precision ordering of the respective composite layers and may result in an unnecessary number of plies, which may contribute to excessive process waste and cost. Still further symmetric laminates have historically proven cumbersome when seeking to taper the exterior surface of a structure, due at least in part to the desire to maintain symmetry throughout, even when dropping ply layers to form the taper. In addition, as the individual or a pair of symmetric plies with substantially the same orientation is dropped to form a taper, the laminate stacking sequence and thus the material's strength characteristics, are altered.

Although not problematic on their own, balanced laminates, like symmetric ones described above, have been traditionally formed by stacking multiple layers of various unidirectional plies at a plurality of precise orientations with relatively large angles between them. For example, each off-axis ply, such as a +45° ply is typically matched (e.g., mirrored) by a −45° ply. In addition, a common practice was to have four-ply orientations incorporating angles of −45°, 0°, +45°, and 90° (i.e., the [0], [±45] and [90] configuration mentioned previously herein, simply using an alternative nomenclature). Three-ply orientations were also common, such as 0°, ±45° configurations; yet critical was that the number of positive (+) and negative (−) oriented plies remain equal.

Balanced and symmetric laminates of this nature have also traditionally created difficulty when trying to minimize laminate and even sub-laminate thickness, requiring ever thinner plies as the only option to offset the need to add 6-, 8- or 10-ply (or even more plies such as being doubled when symmetry is required) to achieve desirable material characteristics. Tapering (i.e., ply drop) complexities have also existed in these structures as well, with one exemplary limitation being that dropping of particular plies or groups thereof must not disturb the desired symmetry and balance. As a result, due to the discrete nature of available ply angles (influenced by both the extra thick sub-laminate structures and the symmetry constraints detailed herein), there were necessarily gaps between achievable laminate stiffness and/or strength characteristics that simply could not be bridged. Multiple failure modes, thousands of fiber discontinuities from ply drops and results from blending, and complexity in manufacturing were thus often faced due to self-inflicted constraints; stated otherwise, an optimal set of material characteristics in a laminate structure oftentimes had to be sacrificed to satisfy various self-imposed constraints; as a result less than optimal laminate structures were used.

Prior improvements upon conventional composite laminate structures include that of double-double sub-laminate structures, which provide a continuous field of opportunities, as compared to the discrete points of conventional configurations, as may be understood by comparison of FIGS. 1A-B with FIGS. 2A-B. Notably, the continuous field of double-double sub-laminate structures achieves sub-laminates with optimally 4-ply thick structures; even thinner 2- and 1-ply thick configurations are obtainable. Throughout, the ply angles are also continuous, making blending of different laminates and their optimization achievable. Sub-laminate thickness remains constant. As a result, far fewer failure modes (and virtually no unpredictable failure modes) are encountered, and automated layup procedures may be conducted in more efficient manners than conventionally available. All of these and still other advantages lead to much simpler and lighter structures that are also better optimized for purposes of efficiency and accuracy.

One exemplary and non-limiting application of double-double sub-laminate structures involves formation of grid, core, and/or skin structures, as may be understood generally with reference to FIG. 3. These structures have generally been formed by producing a grid/skin panel using a high-speed tape laying machine, providing an orthogonal grid formed from sets of ribs, as illustrated. In order to match the height of the ribs and their joints (where two ribs meet), though, a discontinuous insert must be added in every other layer of tape in each rib. This requires cutting of continuous tape during ongoing manufacturing operations, resulting in inefficiencies for production and/or inaccuracies in tape due to inconsistencies or the like in the cutting performed.

Thus, a need exists to provide laminate grid, core, and/or skin structures and methods of manufacturing and using the same that are able to eliminate observed inefficiencies and inaccuracies associated with utilization of continuous tapes of double-double sub-laminate structures and/or even conventional laminate structures.

BRIEF SUMMARY

Via the various embodiments described herein, a grid core, and/or skin structure is achievable not only structurally, but also via a manufacturing process that is significantly more efficient than conventional methods, resulting in saved cost and time. Still further, the new grid/core/skin exhibits improved flexural stiffness and an ease of fabrication, at a reduced weight.

According to various embodiments a composite grid structure is provided, for use in a composite laminate structure. The grid structure comprises a plurality of ply layers, each one of the plurality of ply layers comprising a plurality of first elongate tapes oriented in a first direction and a plurality of second elongate tapes oriented in a second direction, the second direction being offset from the first direction by an angle of at least 25 degrees. In the grid structure: each of the plurality of first elongate tapes in one of the plurality of ply layers has a first length extending between opposing ends of each of the plurality of first elongate tapes and a first midpoint intermediate the opposing ends; each of the plurality of second elongate tapes in one of the plurality of ply layers has a second length extending between opposing ends of each of the plurality of second elongate tapes and a second midpoint intermediate the opposing ends; the first length is the same as the second length; opposing ends of each one of the plurality of first elongate tapes are positioned adjacent opposite sides of the second midpoint of adjacently positioned ones of the plurality of second elongate tapes to define first joint locations; and opposing ends of each one of the plurality of second elongate tapes are positioned adjacent opposite sides of the first midpoint of adjacently positioned ones of the plurality of first elongate tapes, so as to define second joint locations in a staggered joint configuration.

According to various embodiments a composite laminate structure is provided, the structure comprising: a grid component having a plurality of ply layers, each one of the plurality of ply layers comprising a plurality of first elongate tapes oriented in a first direction and a plurality of second elongate tapes oriented in a second direction, the second direction being offset from the first direction by a first angle of at least 25 degrees; and a skin component, comprising a plurality of third elongate tapes oriented in a third direction and a plurality of fourth elongate tapes oriented in a fourth direction, the fourth direction being offset from the third direction by a second angle of at least 25 degrees, the second angle being different than the first angle. In the composite laminate structure: each of the plurality of first elongate tapes in one of the plurality of ply layers has a first length extending between opposing ends of each of the plurality of first elongate tapes and a first midpoint intermediate the opposing ends; each of the plurality of second elongate tapes in one of the plurality of ply layers has a second length extending between opposing ends of each of the plurality of second elongate tapes and a second midpoint intermediate the opposing ends; opposing ends of each one of the plurality of first elongate tapes are positioned adjacent opposite sides of the second midpoint of adjacently positioned ones of the plurality of second elongate tapes to define first joint locations; opposing ends of each one of the plurality of second elongate tapes are positioned adjacent opposite sides of the first midpoint of adjacently positioned ones of the plurality of first elongate tapes, so as to define second joint locations in a staggered joint configuration; and the skin component is positioned adjacent one exterior ply layer of the plurality of ply layers of the grid component.

According to various embodiments, a grid structure is provided, the grid structure comprising: a single ply layer comprising a set of first elongate tapes oriented in a first direction and a set of second elongate tapes oriented in a second direction, the second direction being offset from the first direction by an angle of at least 25 degrees. In the grid structure: each of the first elongate tapes has a first length extending between opposing ends of each of first elongate tapes and a first midpoint intermediate the opposing ends; each of the second elongate tapes has a second length extending between opposing ends of the second elongate tapes and a second midpoint intermediate the opposing ends; the first length is the same as the second length; opposing ends of the first elongate tapes are positioned adjacent opposite sides of the second midpoint of adjacently positioned ones of the second elongate tapes to define first joint locations; and opposing ends of the second elongate tapes are positioned adjacent opposite sides of the first midpoint of adjacently positioned ones of the first elongate tapes, so as to define second joint locations in a staggered joint configuration.

According to various embodiments, a method of manufacturing a composite grid structure is provided. The method includes the steps of: forming a first ply layer by dispensing a first set of first elongate tapes oriented in a first direction and a second set of second elongate tapes oriented in a second direction, the second direction being offset from the first direction by an angle of at least 25 degrees, and forming a second ply layer by dispensing a third set of first elongate tapes oriented in the first direction and a fourth set of second elongate tapes oriented in the second direction. In at least this method: each of the plurality of first elongate tapes in one of the ply layers has a first length extending between opposing ends of each of the plurality of first elongate tapes and a first midpoint intermediate the opposing ends; each of the plurality of second elongate tapes in one of the ply layers has a second length extending between opposing ends of each of the plurality of second elongate tapes and a second midpoint intermediate the opposing ends; the first length is the same as the second length; the dispensing is such that opposing ends of each one of the first and third sets of elongate tapes are positioned adjacent opposite sides of the second midpoint of adjacently positioned ones of the second and fourth sets of elongate tapes to define first joint locations; and opposing ends of each one of the second and fourth sets of elongate tapes are positioned adjacent opposite sides of the first midpoint of adjacently positioned ones of the first and third sets of elongate tapes, so as to define second joint locations in a staggered joint configuration.

According to various embodiments, a method of forming a composite laminate structure is provided. The method comprises the steps of: forming a first ply layer by dispensing a first set of first elongate tapes oriented in a first direction and a second set of second elongate tapes oriented in a second direction, the second direction being offset from the first direction by an angle of at least 25 degrees, forming a second ply layer by dispensing a third set of first elongate tapes oriented in the first direction and a fourth set of second elongate tapes oriented in the second direction, and forming a skin component comprising set of fifth elongate tapes oriented in a third direction and a set of sixth elongate tapes oriented in a fourth direction, the fourth direction being offset from the third direction by an angle of at least 25 degrees. In at least this method: each of the plurality of first elongate tapes in one of the ply layers has a first length extending between opposing ends of each of the plurality of first elongate tapes and a first midpoint intermediate the opposing ends; each of the plurality of second elongate tapes in one of the ply layers has a second length extending between opposing ends of each of the plurality of second elongate tapes and a second midpoint intermediate the opposing ends; the dispensing is such that opposing ends of each one of the first and third sets of elongate tapes are positioned adjacent opposite sides of the second midpoint of adjacently positioned ones of the second and fourth sets of elongate tapes to define first joint locations; opposing ends of each one of the second and fourth sets of elongate tapes are positioned adjacent opposite sides of the first midpoint of adjacently positioned ones of the first and third sets of elongate tapes, so as to define second joint locations in a staggered joint configuration; and the fifth and sixth elongate tapes are positioned adjacent only one or the other of the first and second ply layers defining a skin component adjacent a grid component.

BRIEF DESCRIPTION OF SEVERAL VIEWS OF THE DRAWINGS

Various embodiments of the invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Figures 1A, 1B:
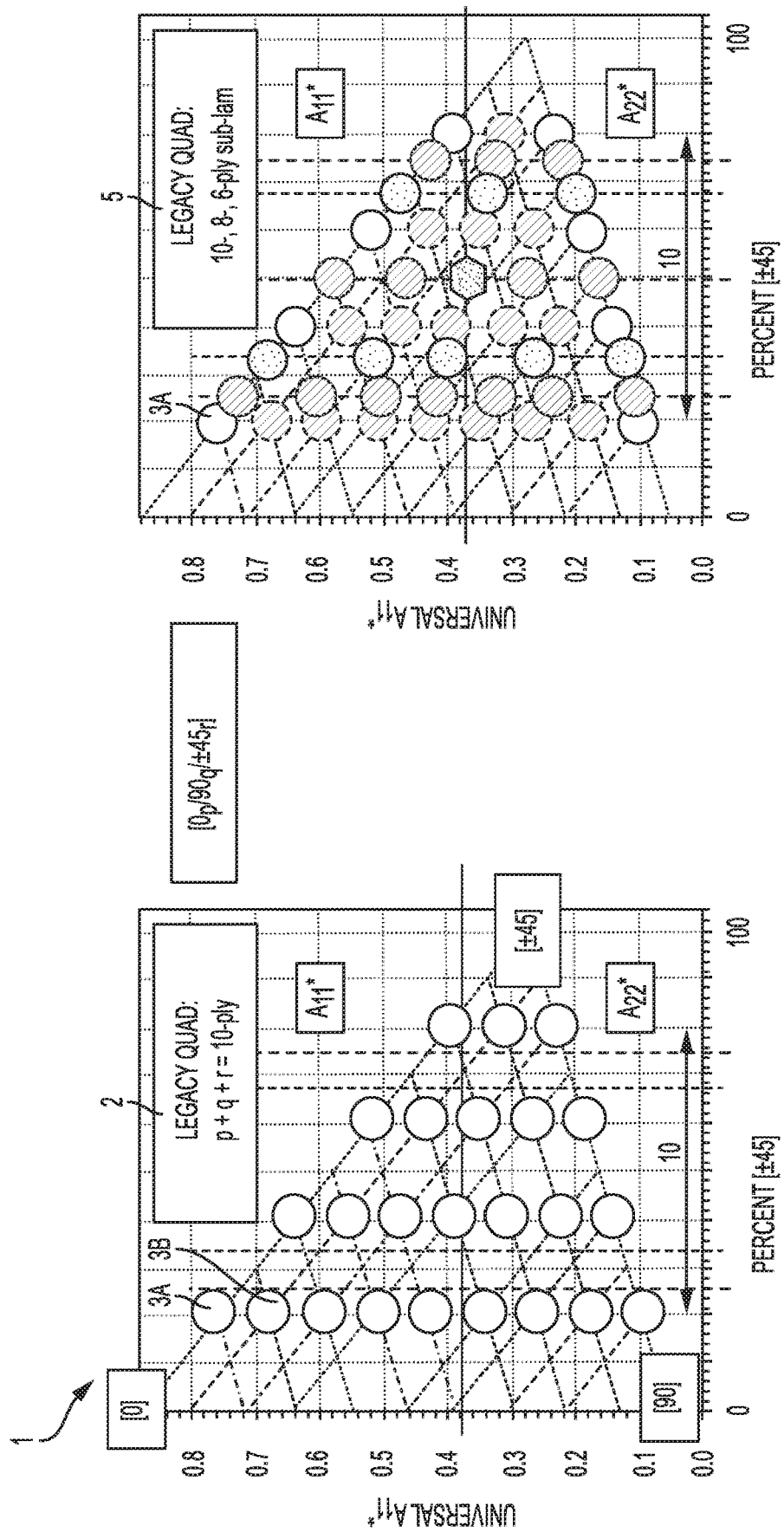
FIGS. 1A-1B shows a legacy quad conventional sub-laminate family, with focus upon a 10-ply configuration.

To facilitate the understanding of various embodiments of the present invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

General Overview

As an initial matter, it is noted that various laminate structure (e.g., ply layers and/or sub-laminate modules) consolidation options exist, as are commonly known and understood in the art. Fabrics within the ply layers and/or the sub-laminate modules may be furnished as dry fibers or pre-impregnated with resin (e.g., prepreg). Non-limiting examples of each, as also commonly known and understood in the art, include the non-limiting examples of Resin Transfer Molding, Vacuum Resin Transfer Molding, Heated Vacuum Assist Resin Transfer Molding, out of Autoclave Processes, and Resin Film Infusion. In certain embodiments, the plies may be carbon fiber plies defined by or formed from a plurality of fibers. Still other embodiments may be alternatively configured with various materials (e.g., fiberglass or an electric conductor such as copper wire). As a non-limiting example, in the context of wind turbine blades, the laminate structures and/or sub-modules described herein may, instead of carbon fiber plies, incorporate fiberglass plies, as may be desirable for cost or other considerations, as the case may be. In still other embodiments, hybridization may be desirable, leading to a mixture of any of variety of combinations of carbon fiber, fiberglass, and/or periodically spaced electric conductor (e.g., copper wire, as lightning protection), or still other materials as ply layers.

As also alluded to elsewhere herein, one exemplary, non-limiting, and useful application of double-double sub-laminates lies in the construction of composite grids and/or composite grid and skin and/or grid/core/skin structures. Notably, with the material characteristics of—in particular homogenized—double-double sub-laminate structures, implementation of grid and skin and/or grid/core/skin-type structures is predictable and achievable; it is also made more efficient alongside optimizable and automated layup procedures that in a straightforward manner are able to create total laminates that are not only strong and light-weight, but also damage tolerant and inexpensive.

Conventional composite grid structures—typically multi-directional in nature—are generally designed to emulate the strength characteristics of conventional metal-based structural materials, and as such have been typically constrained to designs utilizing more than two ply layers or components. One such example, the Wellington fuselage (detailed further in WO 2018/187186) utilizes a grid that was made of aluminum and had a [±45] grid with a nominal [0] tie. One of the most important features of composite grids is the inherent damage tolerance. As one rib or joint is removed by external force or impact, the lattice structure with high density of intersection ribs will form a new network with little loss in the integrity of the entire grid structure. The survival of the Wellington bomber fuselage after battle damage is also a true testimony of this inherent damage tolerance. Notably, traditional laminates (skins without grids) are penalized by at least a factor of 2 for damage tolerance to guard against growth of micro cracking and delamination. Having grids as the backbone of a grid/skin construction is thus a game changing concept that permits fuller use of the intrinsic properties of composite materials.

Recent advances in technology have also identified composite grids as providing an exceptionally light weight configuration and/or alternative to configurations such as those utilized in the Wellington fuselage. For example, unidirectional ribs can replace aluminum tri-ax grids. Still further, any of a variety of angles—both for the grid and the tie (or skin layer)—may be utilized where double-double sub-laminate structures are relied upon. This may be understood first with reference to FIG. 3, wherein two embodiments are illustrated, namely a single skin grid structure 110 and a double skin grid structure 120. One double helix or sub-laminate [±A] is used to form the skin 111 layer, while another double helix or sub-laminate [±B] is used to form the grid 112 components. In this manner a single double-double sub-laminate [±A/±B] may be utilized for any particular skin/grid combination. In certain embodiments, cross-laying of the sub-laminate [±B] achieves the multi-directional (i.e., diamond-like) pattern of the grid and the density thereof may vary according to various embodiments (see also FIGS. 9-10). The rib cross-section can be designed to have many variations in width and depth, and can follow, for example, a cosine power law to further reduce weight. Such drastic taper from root to tip can be a huge design option. The knots (i.e. the intersection of ribs) are most likely to be the weak points in the grid. Special considerations, such as double intersection of plies or tows, instead of triple intersections, and widening the root area of the knot, will help strengthen the knots.

Figure 3:
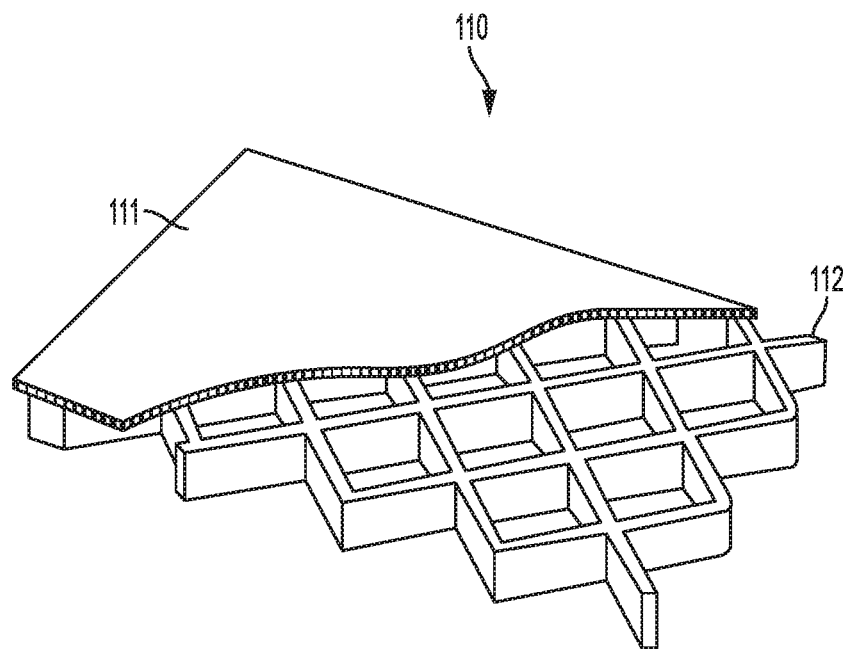
FIG. 3 shows a series of grid and skin constructions formed from double-double sub-laminate material.
Figure 3:
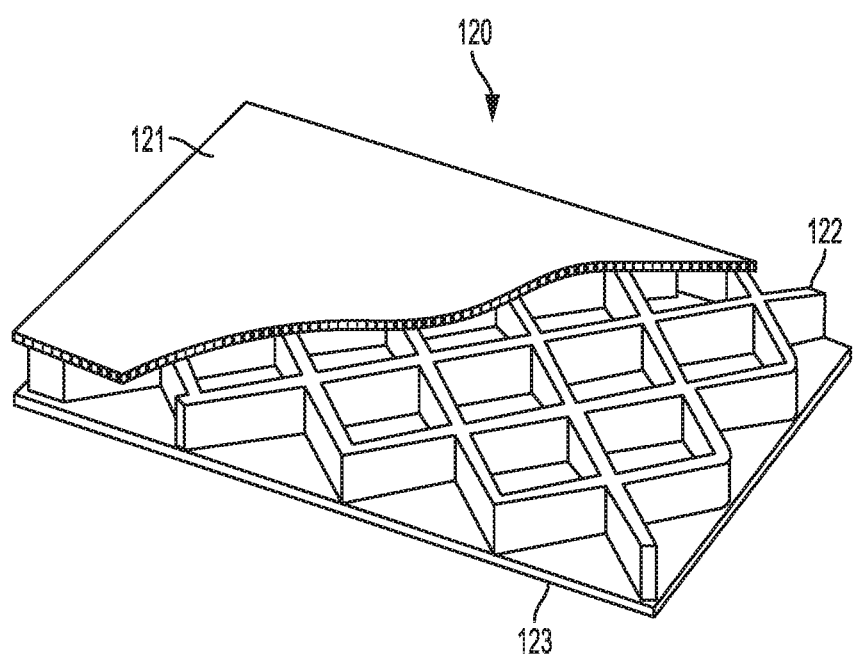

By way of comparison to the single skin grid structure 110, reference is made to the double skin grid structure 120, also in FIG. 3. Therein, one double helix or sub-laminate [±A] is used to form each of the skin layers 121, 123, while another double helix or sub-laminate [±B] is used to form the grid 122 components. In this manner a single double-double sub-laminate [±A/±B] may be utilized for any particular double skin/grid combination, provided both skins are oriented in the same manner, as detailed elsewhere herein. In certain embodiments, cross-laying of the sub-laminate [±B] may again achieve the multi-directional (i.e., diamond-like) pattern of the grid and the density thereof may vary according to various embodiments.

As mentioned, grid is a unique structure, at least due to its ability to have unidirectional composite form its ribs. Thus, the stiffness of a grid with such ribs may be many times stiffer than a grid made—for example—of aluminum. The reason for that is the ribs of an aluminum grid is the same aluminum stiffness at 70 GPa. For carbon composites, the rib stiffness can easily be 180 GPa. Still further, composite materials are generally 40 percent lighter than aluminum. Thus, together with higher stiffness and nearly one half the weight, a composite grid—formed by example from double-double sub-laminate material—may have 4 or 5 times the specific stiffness, as compared to conventional grid structures.

The strength of composite grid structures defined with double-double sub-laminate materials also surpass that of aluminum grid by even a wider margin than stiffness. Thus, the well-known resistance to explosion of the Wellington bomber may be enhanced via utilization of the double-double sub-laminate materials, with greater anticipated effectiveness for—as a non-limiting example—fuselages of airplanes.

Continuous Tape

Figure 4:
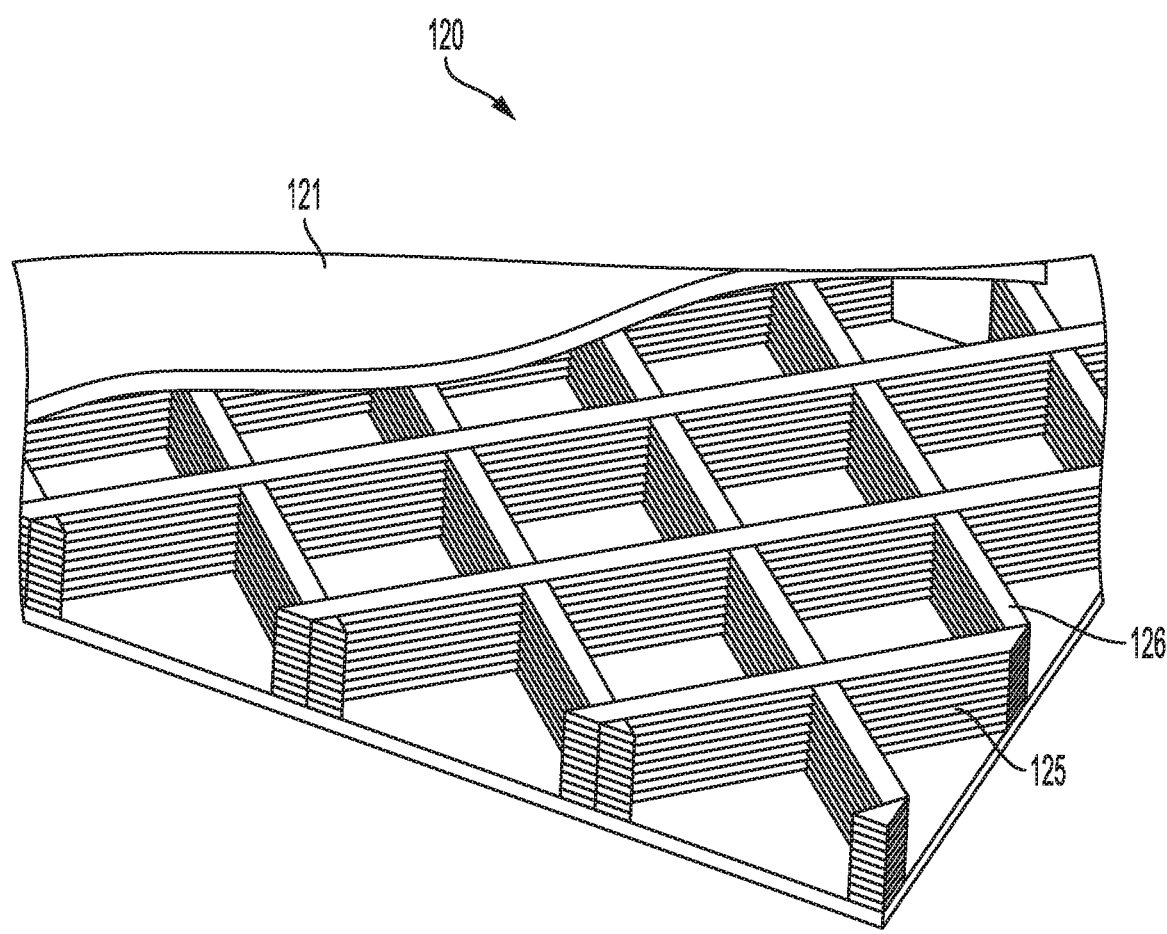
FIG. 4 shows a grid and skin construction formed using continuous tape and discontinuous inserts in accordance with established processes.

Existing configurations and manufacturing processes for obtaining grid and skin composite structures may be understood with reference to FIG. 4. Therein again is illustrated a double skin grid structure 120, analogous to that illustrated in FIG. 3 more generally. In FIG. 4, however, details pertinent to automated layup processes are illustrated. Notably the continuous tapes 125 is therein coupled with the requisite discontinuous inserts 126—provided in an alternating fashion for every other layer, so as to ensure no excessive build-up occurs at joints of the ribs of the structure 120 (see also FIG. 5). Stated otherwise, in order to match the height of the ribs and their joints, the discontinuous insert 126 (having a length of L—b (i.e., length of grid (L) minus width of tape 125 (b))) must be added in every other layer of tape in the rib.

Conventional automated layup machines are capable of cutting the continuous tapes 125 in a real-time manner, so as to ad-hoc produce the discontinuous inserts 126 required; these cuts, however, are feasible only in a direction normal (i.e., 90 degrees) from the insert or tape longitudinal axis. This angle is limited by the cutter of the tape, which is typically limited to a cross-cut (i.e., a 90 degree cut relative to a primary axis of the tape). If the cutter is mounted at an angle of 60 degree to make, for example, a 60 degree cut—applied to a grid-like structure that is a [±30] embodiment. While such configurations were conventionally theoretically possible, for ribs going in the minus direction, the cut would have had to be in the minus degree cut. With conventional continuous tape configurations, complications exist that limit the feasibility of this approach.

As another non-limiting example, a double skin grid structure 120 may be built up, layer by layer, with continuous tape 125 coupled with discontinuous inserts 126 (see FIG. 5), repeated as many as 35 times in certain panels formed for commercial applications or the like. In certain embodiments, the tape may be fixed with some thermoplastic particles, so that stack of plies (particularly when 35 layers thick or more) will not move until tooling, bagging, vacuum, and resin infiltration are to occur. As an example, the tooling may be a rubber block that fills the space between the ribs so when vacuum is pulled, the rubber block exerts pressure on the lateral sides of the ribs, thereby maintaining their structural orientation under pressure. After oven curing, the bagging material may be removed, along with the rubber tooling.

Figure 5:
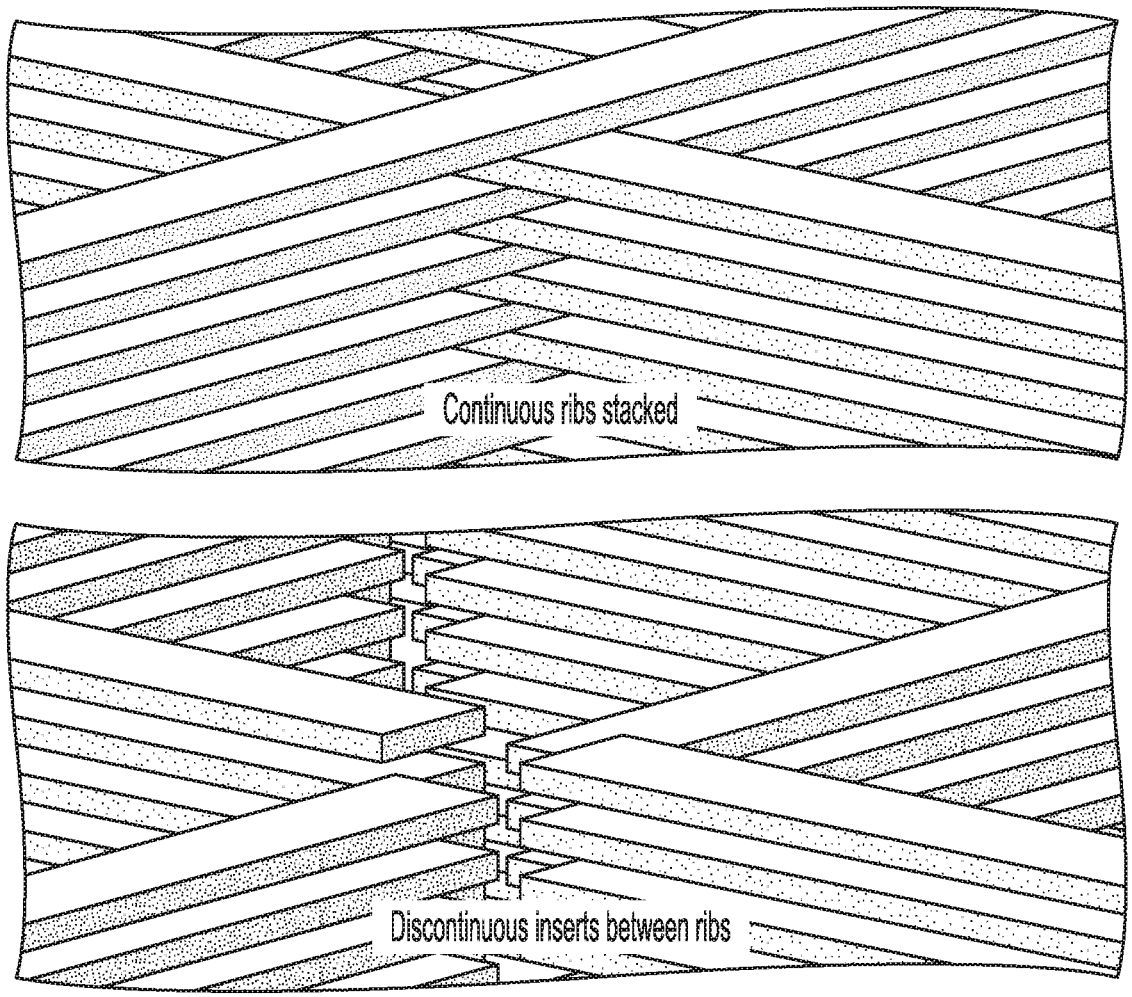
FIG. 5 shows the continuous ribs and discontinuous inserts of FIG. 4 in a stacked orientation.

FIG. 5 is also informative as to the requirement for discontinuous inserts. In the uppermost image provided therein, an undesirable embodiment of continuous ply stacking—without discontinuous inserts—may be understood. Without the discontinuities, excessive build-up (and thus weight, and other material characteristic-focused inefficiencies) build-up at the joints, namely where two or more continuous plies overlap relative to one another. This build-up may be avoided by alternating continuous plies with discontinuous inserts between respective joints. Such an approach, however, likewise contributes to material characteristic-focused inefficiencies, including the creation of weak joint areas extending through an entirety of a laminate structure, as detailed elsewhere herein.

Discontinuous or Finite Length Tape

Figure 6:
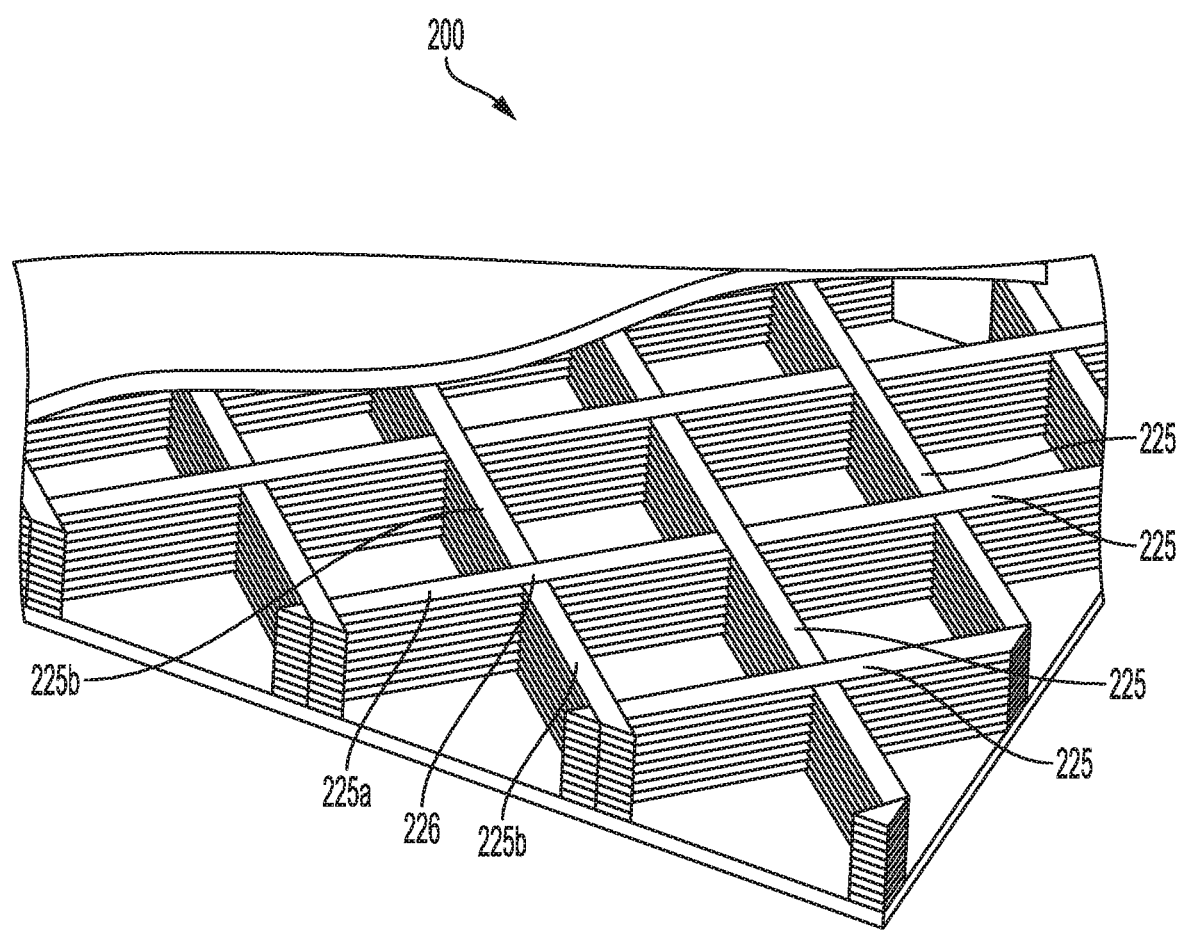
FIG. 6 shows a grid and skin construction formed using discontinuous tape constructions according to various embodiments.

As compared to the continuous tape and discontinuous insert configuration of FIGS. 4 and 5, various embodiments of the present inventive concept may be understood with reference first to FIG. 6. Therein, a configuration is illustrated that uses prefabricated discontinuous (i.e., finite length) tapes 225, which may be staggered for use in all directions and for all ribs of any desired laminate structure 200, including grid, grid/skin, and/or grid/core/skin structures. As a non-limiting example, each finite length tape 225 may have a length approximately twice that provided between adjacent joints, accounting for the width of the tape itself, as may be understood also from FIG. 7. Stated otherwise, in certain embodiments the length of each finite length tape 225 may be (2L–b), with (L) being the length or size of the grid (i.e., between each adjacent joint) and (b) being the width of tape 225. Thus, as a non-limiting example, if the joints are spaced at 10 inches apart and the tapes are 1 inch wide, each finite length tape would be 19 inches long. As another non-limiting example, if the joints of a grid are spaced at 5 inches apart and the tapes are 1 inch wide, each finite length tape would be 9 inches long. Any of a variety of lengths may be envisioned; still further finite length tapes of differing lengths may be utilized in different layers of a grid/skin structure, as detailed elsewhere herein. As one example, the lengths may be longer for the skin, as compared to the grid layers.

It should also be understood that the above-detailed embodiment is but a non-limiting example. Each finite length tape 225 may be otherwise dimensioned, for example such that each may have a length approximately three times that of the grid, once again defined as a length between adjacent joints of the grid. Still other dimensioning may be envisioned, with the common characteristic across all being that joints created by discontinuities (due to the finite length of the tape) are staggered relative to one another as a result of the finite length being some degree longer than the spacing between adjacent joints. In this manner, discontinuities at joints do not extend through an entirety of a composite laminate, as in conventional configurations such as that illustrated in FIGS. 3 and 4. Still further, discontinuities are more evenly distributed throughout a composite laminate, thereby providing more evenly uniform material characteristics of the composite laminate.

As mentioned, in certain embodiments, the discontinuous or finite length tapes 225 may be stacked in a staggered pattern, so the number of discontinuities may remain the same as the conventional stacking sequence (see FIGS. 4 and 5), but be more evenly distributed across an entirety of a composite laminate. This may be further understood with reference once more to FIGS. 6 and 7, in combination. For example, in the uppermost layer of tapes 225 illustrated in FIG. 6, joint location 226 is defined only by respective ends of finite length tapes 225b. Crossing this joint location 226 is a continuous finite length tape 225a, whereby—at least as illustrated—a midpoint of tape 225a corresponds approximately to the joint location 226. Stated otherwise, joint location 226 is defined by only two ends of two adjacently positioned tapes 225 and overlaid by a midpoint of a third adjacently positioned tape 225. In at least the illustrated embodiment, the third tape 225a is oriented substantially perpendicular to the remaining two tapes 225b. It should be understood, though, that as detailed elsewhere herein, angles between the tapes may vary. As a result, end structure for the tapes 225 may likewise vary, differing for example from the normal (i.e., right angle) orientation of the end relative to a length of the tape, as illustrated in FIG. 6.

From FIG. 6, it may also be understood that any joint location 226—relative to three layers of plies established using continuous finite length tape 225—will have a joint discontinuity only in one (or only in two, depending on the sequencing involved) of the three layers. Notably, where ply 225a provides continuity across joint location 226, in the layer below a ply 225b may provide the same, thus resulting in a configuration such as that illustrated in the lower portion of FIG. 7, whereby gaps 227 are provided between adjacent joints or joint locations 226. From this, it may thus be understood that an exemplary and non-limiting advantage of using finite-length discontinuous tape 225 is that the tapes can be pre-fabricated and stacked in a dispenser, thereby building the grid by laying up or dropping (in the example of a taper (see FIG. 7) one layer at a time, thereafter moving to another location for the next drop, following a staggered pattern (again, as illustrated in FIG. 6) that results in a more evenly distributed spacing of discontinuities throughout a composite laminate.

Figure 7:
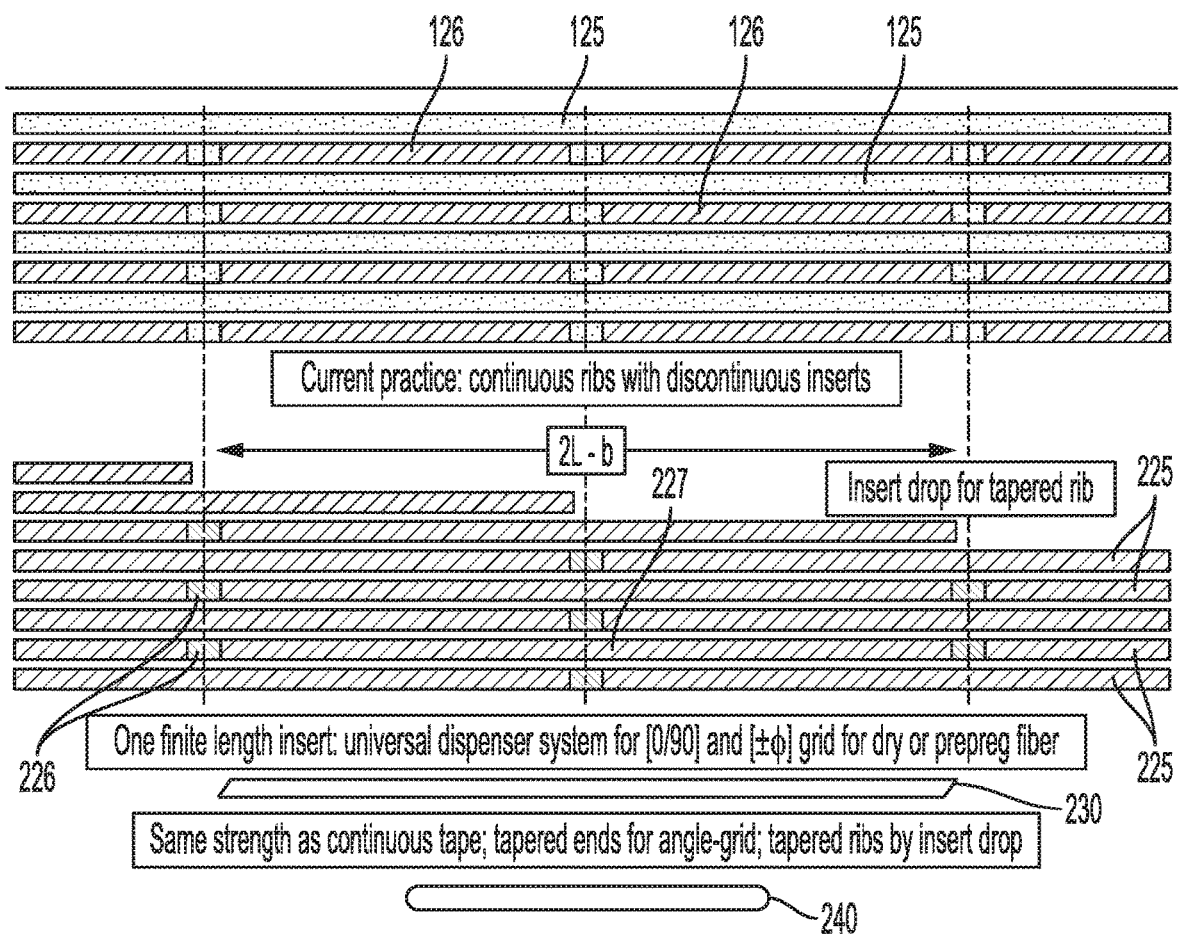
FIG. 7 shows a comparison of continuous tape/discontinuous insert with discontinuous tape constructions according to various embodiments.

With reference now once more to FIG. 7, at the top may be seen an illustration of conventional practices, utilizing continuous tape 125 with discontinuous inserts 126, as also detailed previously herein with reference to FIGS. 4-5. The lower portion of FIG. 7, by way of comparison, illustrates an exemplary and non-limiting embodiment of the inventive finite-length tapes 225, in this instance having length (2L-b), as previously defined herein. As may be seen, the lower portion of FIG. 7 provides a configuration having more evenly distributed joint locations 226. Immediately adjacent joint locations horizontally are not in the same ply layer, as in the upper portion of FIG. 7. Stated otherwise, staggering and alternating of joint locations occurs both vertically and horizontally, resulting in a plurality of gaps 227, greater in magnitude than the gaps present in conventional practices.

As may also be understood from FIG. 7, tapering of any sub-laminate or composite laminate structure formed using the staggering process with the finite-length discontinuous tapes 225 is straightforward. Tapering may be achieved by simply sequentially eliminating respectively adjacent ones of the tapes 225. Tapering—accomplished via sequential ply or tape 225 drop—may be done at an upper (as illustrated) or a lower location. This may be contrasted with the complex tapering procedures required for conventional configurations, particularly those where symmetry limitations are imposed for strength and other tape characteristics.

As mentioned, and as illustrated in the lower portion of FIG. 7, ends of the finite-length discontinuous tapes 225 may be cut normal to a length of the tapes. Such ends are useful for square-square grids, or those involving angles of [±45] (see also, FIG. 4). In other embodiments, though, non-normal (i.e., non-right angle) oriented tape ends may be desirable and provided. In FIG. 7, an exemplary straight-edge but angled cut end 230 is also illustrated, whereby grids at angles other than [±45] and encompassing the continuous field of double-double structures may be achieved. As exemplary and non-limiting examples, the end (and thus grid/skin) angles may be between [±45] and [±15]. Optimal ranges may be between [±25] and [±65] and/or between [±20] and [±70] and/or between [±22.5] and [±67.5]. The ends of the finite length tapes 225 may further vary as between skin and grid and/or skin, grid, and core layers within any particular sub-laminate module or composite laminate structure. For example, tape ends for skin layers may be [±15], while tape ends for grid layers may be [±60]. Angular restrictions on grids are stricter than for on skins, with the grid layers generally remaining between [±25] and [±65], as previously referenced.

Also illustrated in FIG. 7 is a semi-circular or elliptically cut/shaped end 240. In contrast with any straight-edge angled cut, having a rounded, semi-circular or elliptically shaped end 240 in certain embodiments enables utilization of the finite-length tapes 225 at any desirable angle. Stated otherwise, end users would have the flexibility to select any desirable angle for layup via use of the rounded end 240 finite-length tapes. By way of comparison, conventional tapes are not pre-configured or pre-fabricated with this degree of flexibility; instead, conventional tapes are cut only orthogonally relative to their length.

Figures 2A, 2B:
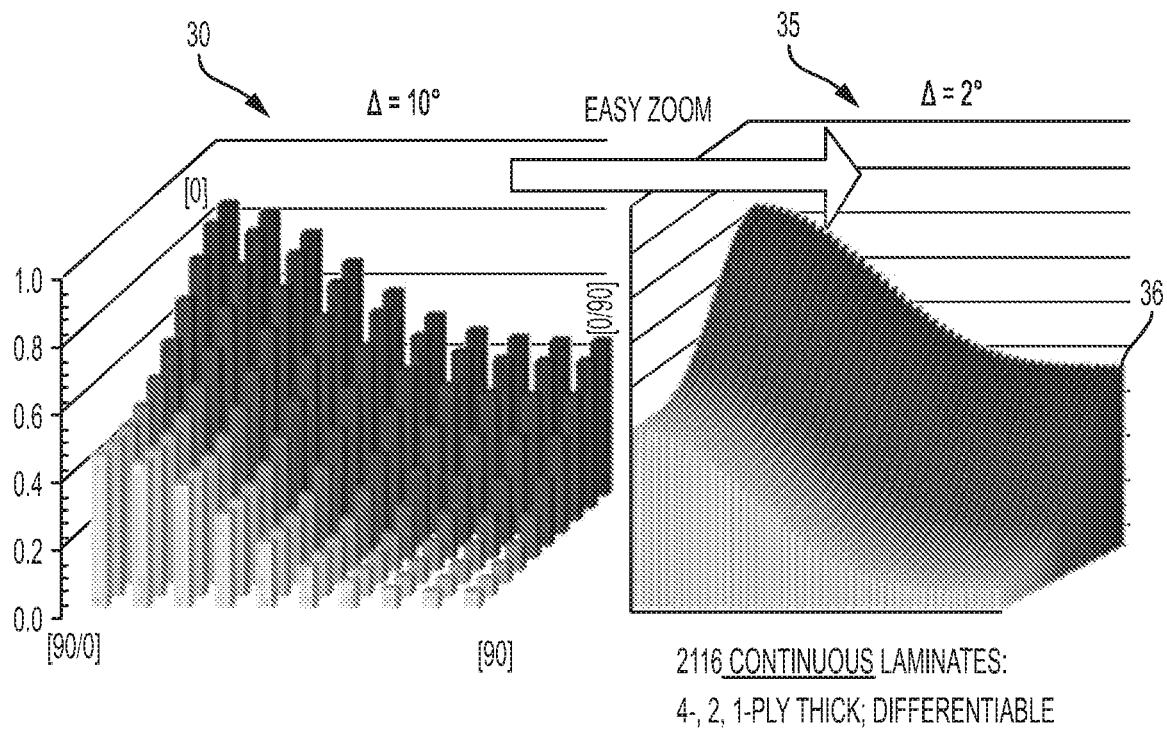
FIG. 2A shows one master-ply stiffness component of all of the sub-laminates within the double-double sub-laminate family.
FIG. 2B shows two three-dimensional representations of the double-double sub-laminate family at angle increments of 10 and 2 degrees, respectively.

Another exemplary and non-limiting example as compared to a moving tape laying machine is thus the possibility to have tape with ends cut with any of a variety of angles other than square or normal cuts (see also FIG. 7). In this manner, it is possible to have grids not only at [±45] but also at any pair of angles [±A/±B], for example [±30/±60], where further possible angle pairs may be selected from the continuous field of double-double, illustrated in FIGS. 2A-2B.

Although FIG. 7 illustrates a plurality of layers of tapes 225 forming a grid-like structure, whether tapered or not, with all layers being of equal thickness relative to one another, it should also be understood that the thickness of the tapes may also vary, at least from layer to layer. Stated otherwise, some tape layers may be thicker than others, as may be desirable for addressing material characteristics (i.e., stiffness, strength, or the like) in a particular area of a composite laminate structure formed from the grid-like array defined by the dispensed tapes. In other embodiments, as illustrated, tape thickness may be consistent throughout.

In certain other embodiments, widths of the tapes 225 may also vary, relative to different parts of a composite laminate structure—or more particularly for different parts of a component to which the same is applied. Still further, different heights of the ribs of the grid (as defined by the tapes) may also be provided at different regions in a component or an application to which a composite laminate structure is applied. Additionally, material structure may differ for the grid elements as compared to that for the skin. As detailed elsewhere herein, a prefabricated core may also be provided, with grid on one side, to be bonded to a skin later. Exemplary applications, as may be understood with reference to FIG. 10, may include a cylinder (fuselage) with prefab interior grid embedded in a core material to be finished with the exterior skin (by tape or filament winding), or a prefab cylindrical skin followed by core with grid, and finish with exterior skin such as an all [90] or near [90] winding to put pressure on the assembly for final co-cure.

To reiterate and remaining with FIG. 7, it should also be understood that when ribs (i.e., of grid components) are orthogonal, ends of the finite-length tapes 225 will be square or normal (i.e., right-angle) oriented relative to a length or longitudinal axis of the tape. When ribs are not orthogonal, the cut in the tape (or ends of the finite-length versions thereof) will not be square. With conventional tape dispensing procedures (i.e., tape laying heads or the like), non-square cuts or ends of this nature are difficult to accommodate. Thus, rectangular or square-square grid (with angles of [±45]) are more common.

Via utilization of finite-length tapes—whether with pre-angled ends or rounded ends (for dispensing at any desirable angles), non-square or rectangular grid structures are achievable. As previously described herein, rounded ends are particularly advantageous, in that they are universal rather than at a fixed angle—for example that of 60 degrees (also mentioned previously herein), which would have to be matched with corresponding minus 60 degree angle ribs or tapes. Because of at least these complexities, grids with continuous tape and discontinuous inserts (see again FIG. 4) cannot be readily made with grid other than orthogonal tape. Ribs made with finite length tape, particularly those having round or even elliptical-shaped ends, overcome these and over complexities and hurdles.

Figure 8:
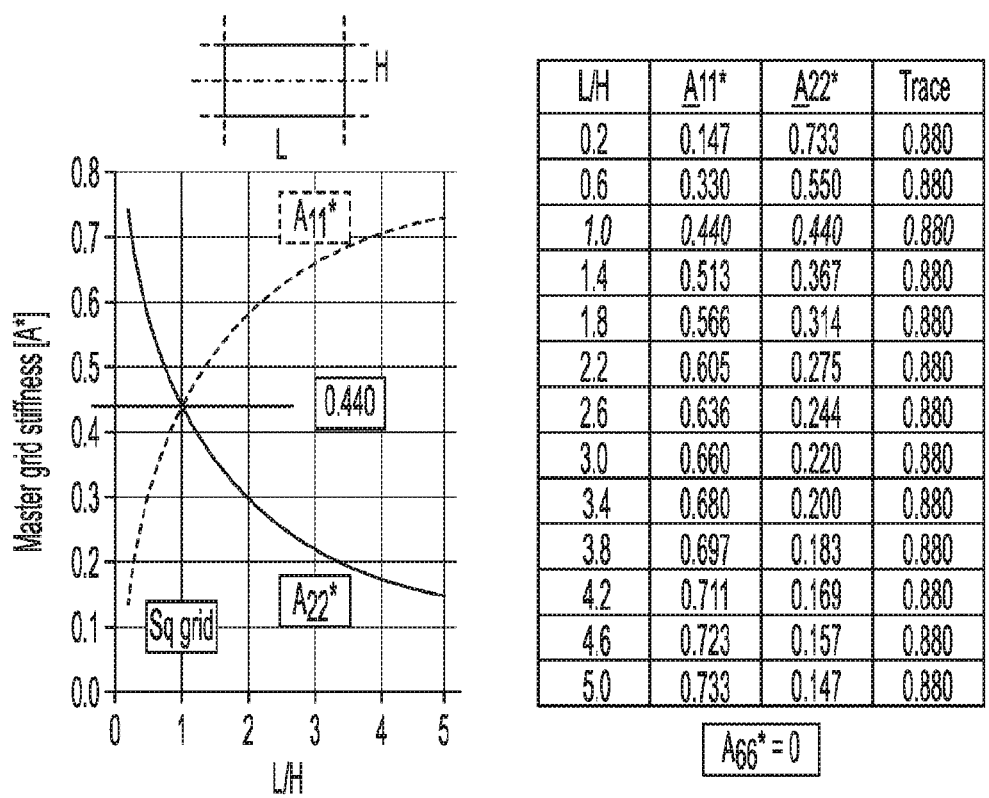
FIG. 8 shows stiffness components of rectangular grids as functions of L/H using discontinuous tape constructions according to various embodiments.
Figure 9:
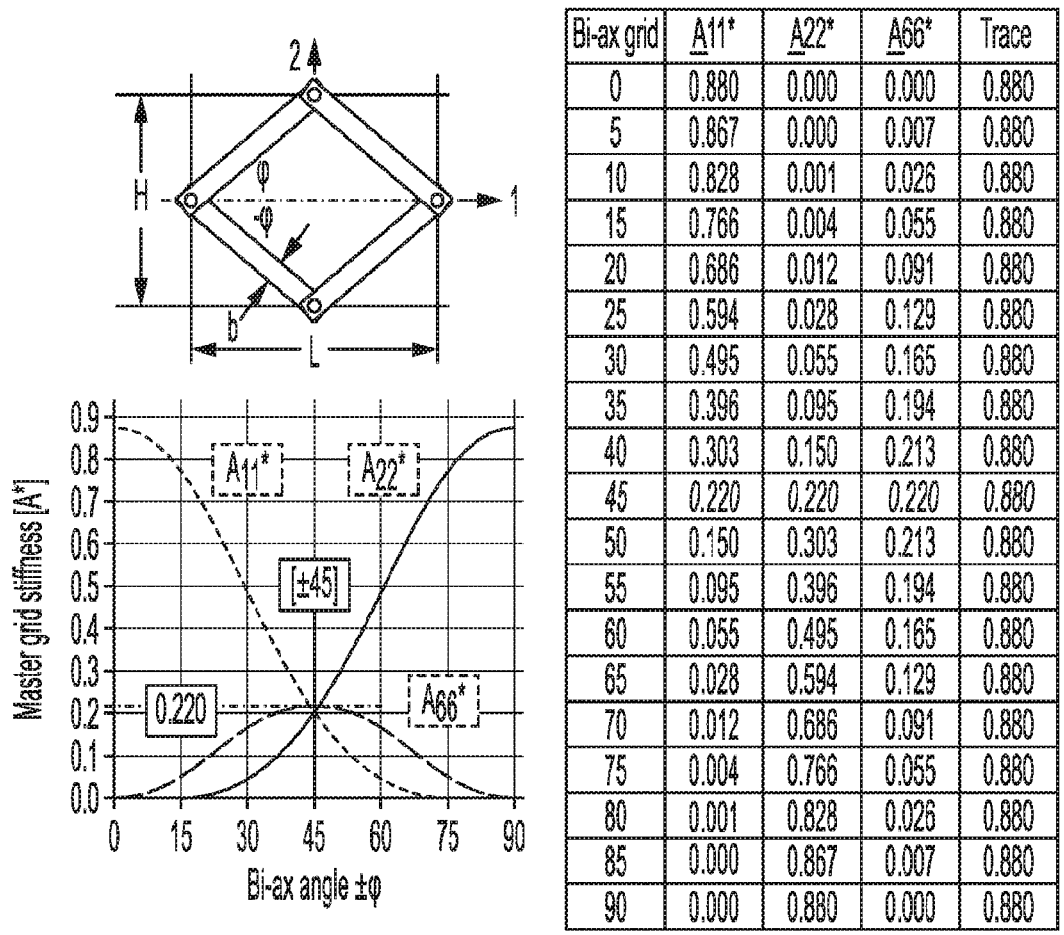
FIG. 9 shows stiffness components of angular grids as functions of L/H using discontinuous tape constructions according to various embodiments.

This may be further understood with reference to FIGS. 8 and 9 in combination. In FIG. 8, stiffness components of square or rectangular grids are illustrated, as functions of L/H, where L is a length between joints in a first direction and H is a length between joints (of the grid) in a second direction perpendicular (as illustrated) to the first direction. To determine the stiffness components of non-square grids—including rectangular grids, the same can be derived by their transformation or partitioning of trace. Generally, trace of a grid will be approximately 88% of a composite ply of the same material. Variations in stiffness—and trace—are thus achievable as the L/H aspect ratio is varied. Optimal aspect ratios, as illustrated may range from 0.2 to 5.0. This may prove advantageous, depending upon what stiffness characteristics are desirable for particular applications (see e.g., the vessel of FIG. 10).

Square and rectangular grids shown in FIG. 8 are one class of grid structures. Their advantage may be the resistance to longitudinal compressive loading such as shells for rockets. An exemplary advantage is that all joints are at 90 degrees. Finite length composite strips can have square ends, but an exemplary disadvantage for rectangular grids is the need to have two different lengths in the finite length strips because the distances between joints in a rectangular grid are different. Only in square grids, they are equal, which gives rise to bi-axial grids, their advantages and applications, as illustrated in FIG. 9.

Specifically in FIG. 9, an exemplary extension of [±45] grids (whether rectangular or square) is illustrated, relevant to general angular or bi-axial grids. As with square or rectangular grids, stiffness—and other related material characteristics—may be varied in different directions along the grid structure, depending upon the angles chosen for the bi-axial grid. Use of finite length discontinuous tapes further enhances material characteristics, as compared to continuous tape and the inserts required therewith, as previously detailed herein. Bi-axial grid angles may range from 0 to 90 degrees, although as detailed elsewhere herein, ranges from 20 to 70 degrees are generally optimal. Still further optimal may be ranges from 22.5 to 67.5 degrees.

Figure 11:
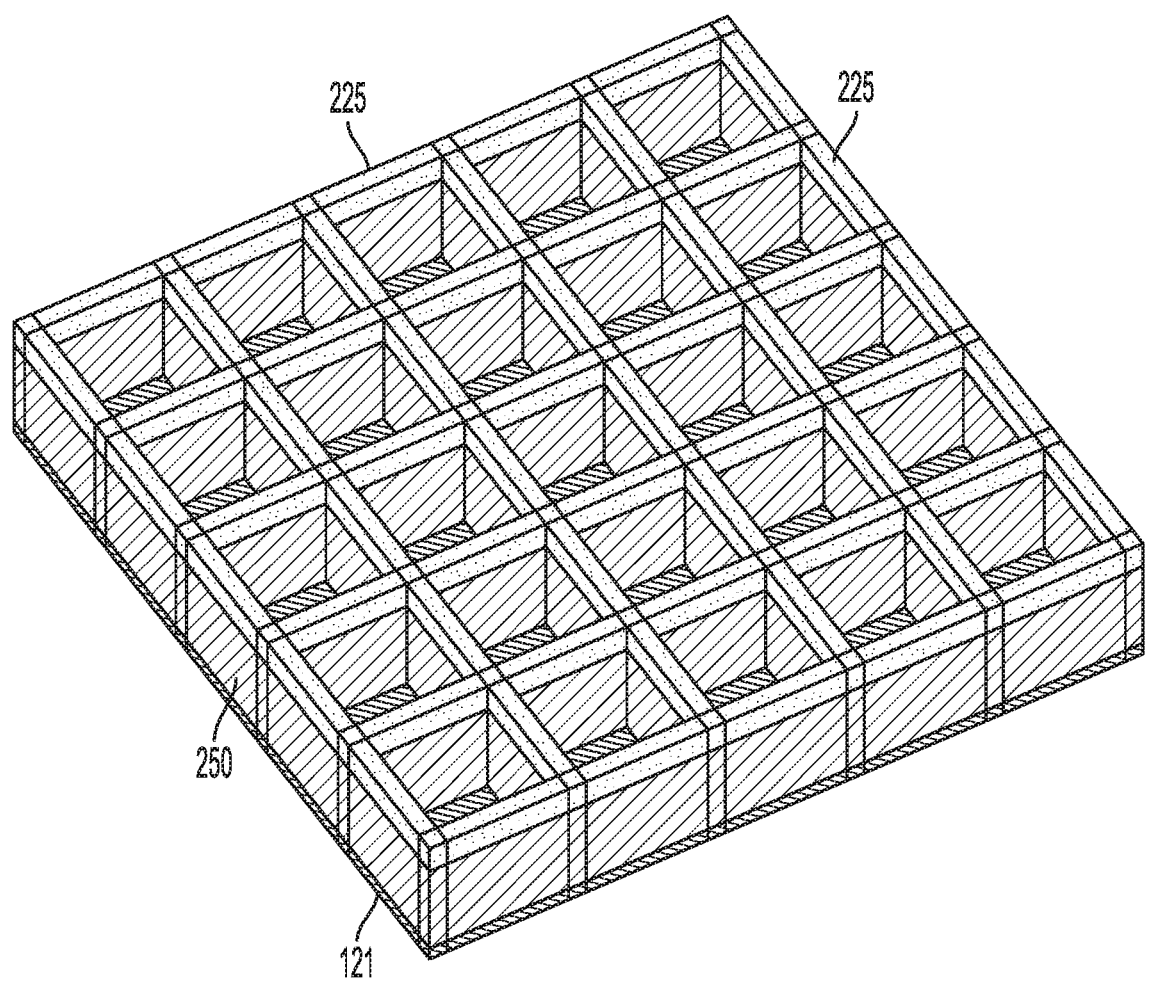
FIG. 11 shows an exemplary grid, core, and skin construction formed using discontinuous tape constructions according to various embodiments.

In certain embodiments, a sandwich core 250 may also be added relative to the ribs formed from the discontinuous tape 225 (see FIG. 11), thus increasing the flexural stiffness significantly and avoiding the difficulties in building extra tall ribs. Thus the new grid/skin could be one with a core that can be aluminum or plastic honeycomb or any light-weight plastic or composite material. In the building of the grid/skin, the skin 121 (see FIG. 11 once more) can be laid first on a tool. This skin can be pre-cure or uncured with subsequent resin infusion. Then the core 250 can be placed above the skin 121. The core 250 can be a solid piece, or one that may be shaped with cutouts like a grid. Then the grid (from discontinuous tape 225) is laid over the top of the sandwich core 250, either by the established method of continuous tape with discontinuous inserts, or by the inventive and newly described double-length discontinuous tapes described previously herein. In the example illustrated in FIG. 11, the core is 72% of the total height, the grid is 18% of the total height, and the skin is 10% of the total height. The percent of area of the core/grid is 25%. Different percentages, by height, area, and/or weight, may of course be utilized.

With the separation between the skin and grid by the core, it avoids the difficulty of building an extra tall rib. With stacking of dry tapes, in established processes, it is hard to go much higher than the 35 layers that has been done. The wall of the rib cannot stay erect before tooling is inserted to hold the rib in place. With the core place in between the skin and grid, the height of the core can be of any height. The height of the rib required above the core can be drastically reduced. It is like the skins of a sandwich panel. Only very thin skins are required. The grid in this new concept will not need very tall rib. Also wide ribs can be just as easily laid as narrow rib. It is a very stable condition. The grid and skin now will be like a sandwich panel. It is better than a sandwich structure between it is ab open structure that inspection and repair will be easy. Also with grid, attachment or hard point can be more easily accommodated. Conventional sandwich panels cannot accommodate hard points without filling the honeycomb cells with potting compound. That may be done when the panels are made. But to add potting compound to an existing sandwich panel is a very difficult task. With a grid, this is a much easier task. After curing, the extracted core material beyond that as part of the rib can be removed by a router. The finish of the side of the rib with both the core and the composite rib cap can be square and smooth. At the joints, there can be a fillet rather than a sharp corner.

An exemplary advantage of incorporating a core is reduction in the cost of manufacturing. The cross-sectional area of the grid and skin is linearly proportional to the in-plane stiffness and strength of the grid/skin, essentially the same with or without the core. But building a tall rib is oftentimes a challenge. Ribs with less height are much easier to build and secure in their desired orientation. With a core, construction of taller ribs without loss of structural integrity can be more easily done. For higher flexural stiffness, the addition of a core is a more effective way as routinely done with sandwich panels. Also notably, grid/core/skin structures can be made with automation, in one large piece, and without fasteners. The conventional frame/stringer and spar/rib are so complicated and automation is very limited, and use of fasteners are often required.

Layup and/or Dispensing Procedures

As alluded to previously herein, in certain embodiments, the finite-length or discontinuous tape can have a completely novel tape dispensing method. Instead of a tape laying head (or heads). Indeed, an exemplary and non-limiting advantage of finite-length discontinuous tape is that they can be pre-fabricated and stacked in a dispenser, thereby building the grid by laying up or dropping (in the example of a taper (see FIG. 7) one layer at a time, thereafter moving to another location for the next drop, following a staggered pattern (again, as illustrated in FIG. 6) that results in a more evenly distributed spacing of discontinuities throughout a composite laminate.

Figure 10:
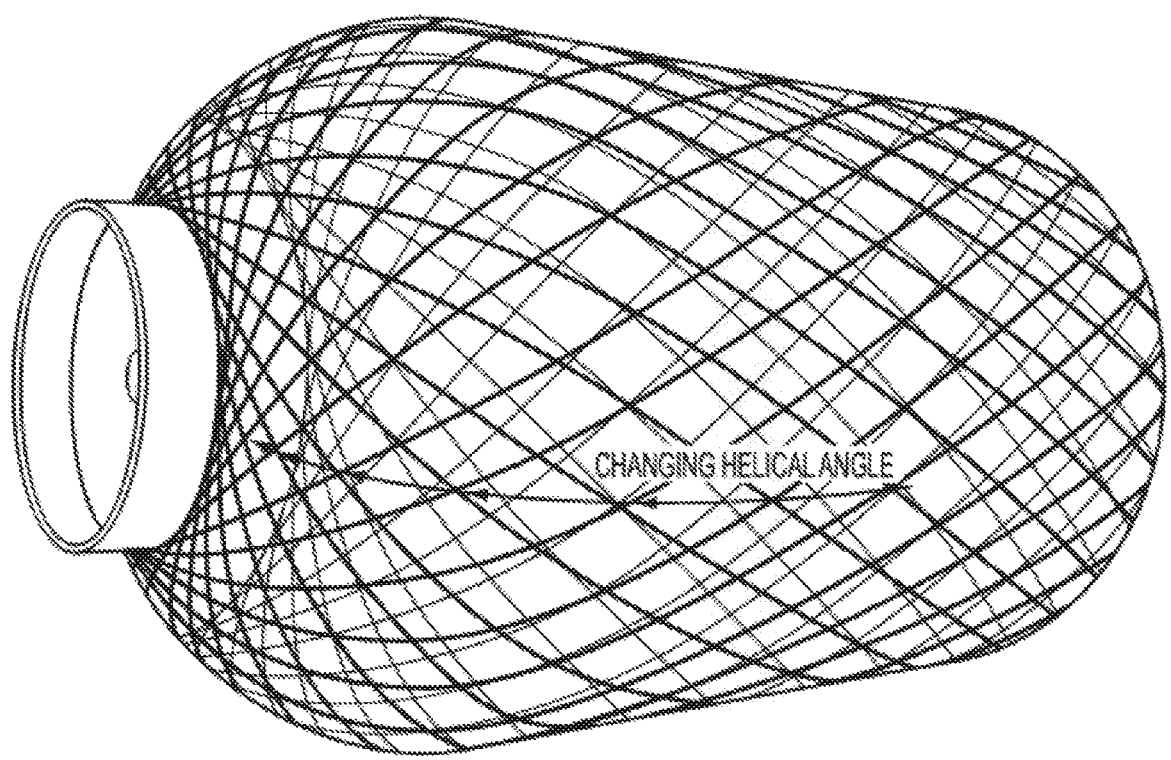
FIG. 10 shows an exemplary application of discontinuous tape constructions, together with details for all-hoop or helical winding layup processes.

Dispensing in this manner, along with the variations available (e.g., angled grids, rounded tape ends for variable angles, and the like) enable layups on complex three-dimensional structures, with changing helical angles, as illustrated in FIG. 10. Still further, various embodiments of the finite length tapes described herein exhibit comparable material characteristics (e.g., stiffness, strength, or the like) as the ones with continuous ribs with discontinuous inserts. In the continuous rib/discontinuous insert configurations, though, material characteristics such as strength of the joints are dictated by the inserts. Using finite length tapes eliminates this restriction, such that the same number of joints may be provided, but more uniformly distributed, offering the same or enhanced strength.

Dispensing of finite length tapes also requires different machines. Instead of the high-priced tape laying or fiber placement machine, dispensers—in certain instances automated—are provided, for distribution of precut strips. These strips (i.e., the finite length tapes detailed throughout herein) can have angles other than 90 degree or square cuts (i.e., ends). The ends of the tapes can also be cut (i.e., via the dispenser, in a real-time manner, or prior to distribution) at any angle, as previously detailed herein. The ends may alternatively be rounded or otherwise shaped so as to accommodate user selection of any angle. The dispensers can be fixed with the part moving, or the opposite.

Additionally, achieving a panel with constant thickness is much easier for assembly with other components within a large structure. Examples include a floor beam/panel to be attached to a fuselage and/or a helical wound cylinder and head, as illustrated in FIG. 10. Still further, an open structure like grid/core/skin is easy to inspect and can also accommodate water and air pipes and electrical conduits and devices to penetrate the core without affecting the performance of the floor panel and/or other structure. In case of fuselage skin, additional exterior skin can be added to the grid. Thus there is an interior skin to take up the internal pressure, the core that provide the desired balance between in-plane and flexural stiffness, the grid to provide the damage tolerance (like the Wellington Bomber), and an outer skin that can be vented to provide a shield for laminar flow. Additionally, without fasteners, the weight of skins can be minimum gage. With thin plies, this gage can be much smaller and buckling can be reduced as the ribs can limit the critical length.

In summary, exemplary benefits and advantages include ultra-light weight (less than 30 percent of aluminum, with equal strength and damage tolerance), automated production feasibility, open structure for easy inspection and repair, flexibility in hard points or surfaces, a clean panel with uniform thickness for easy assembly, easy accommodation of external features like tubing, piping and/or conduit, easy tapering from wing root to tip in all of the components in grid, core and skin to save weight, minimum scrap in fabrication, choice of single or double skins, use of single double or double-double for one or two skins, use of thin or thick plies, so either the single double or double-double need to have only 1-axis layup (no need for cross-plying) that reduce time of layup.

Substructures built up by spars and ribs in wings, and circular frame and longitudinal stiffeners in fuselage can also be replaced by grid structures, particularly those utilizing finite length tapes according to various embodiments described herein. An exemplary difference is that grid share their joints in the same plane, whereas conventional substructures do not share their joints. The intersecting structural members are not connected. In fact, "mouse holes" are needed to one system of members and go under the other member. This is done, for example, in fuselages (see FIG. 10 by way of analogy) where circular frames are cut to allow the cross member like stiffeners to go through. Such practice is acceptable for aluminum structures where machining "mouse holes" are relatively easy and with inherent plasticity of aluminum, the penalty for having holes cut is minimal. In stark contrast, with composite frame such cuts may change the laminate design of the frame and thus add weight and cost to the structure. Grid, on the other hand, does not have the same problem. Intersection ribs merge into a grid. In fact, the joints are interlocked and provide additional rigidity than if the two intersection substructure members are totally detached as is the case of the frame and stiffeners in a fuselage. The joints are one of the sources of damage tolerance of a grid network, with the additional even distribution thereof—via utilization of the finite length tapes described according to various embodiments herein—further enhancing these (and other) exemplary desired characteristics.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A composite grid structure for use in a composite laminate structure, the grid structure comprising:
   a plurality of ply layers, each one of the plurality of ply layers comprising a plurality of first elongate tapes oriented in a first direction and a plurality of second elongate tapes oriented in a second direction, the second direction being offset from the first direction by an angle of at least 20 degrees,
   wherein:
      each of the plurality of first elongate tapes in one of the plurality of ply layers has a first length extending between opposing ends of each of the plurality of first elongate tapes and a first midpoint intermediate the opposing ends;
      each of the plurality of second elongate tapes in the one of the plurality of ply layers has a second length extending between opposing ends of each of the plurality of second elongate tapes and a second midpoint intermediate the opposing ends;
      the first length is the same as the second length;
      opposing ends of each one of the plurality of first elongate tapes are positioned adjacent opposite sides of the second midpoint of adjacently positioned ones of the plurality of second elongate tapes to define first joint locations, each of the first joint locations being defined by only two ends of two adjacently positioned ones of the plurality of first elongate tapes and no ends of the plurality of second elongate tapes;
      opposing ends of each one of the plurality of second elongate tapes are positioned adjacent opposite sides of the first midpoint of adjacently positioned ones of the plurality of first elongate tapes, so as to define second joint locations, each of the second joint locations being defined by only two ends of two adjacently positioned ones of the plurality of second elongate tapes and no ends of the plurality of first elongate tapes; and
      each of the first and second elongate tapes has a longitudinal axis extending between the opposing ends of each of the first and second elongate tapes and along the length thereof, the opposing ends of each of the first and second elongate tapes having a semi-circular rounded shape relative to the longitudinal axis of the first and second elongate tapes.

2. The composite grid structure of claim 1, wherein the semi-circular rounded shape is elliptical.

3. The composite grid structure of claim 1, wherein the plurality of ply layers includes at least six distinct ply layers with each of the plurality of first and second elongate tapes staggered relative to one another.

4. The composite grid structure of claim 1, wherein the angle between the first direction and the second direction is between 25 and 70 degrees.

5. The composite grid structure of claim 1, wherein at least one of the first and second lengths is (2L−b), wherein (L) is a size of each grid opening measured from respective first and second midpoints of adjacently positioned ones of the first and second elongate tapes, and wherein (b) is a width of the first and second elongate tapes.

6. The composite grid structure of claim 1, wherein the first and second joint locations in a single one of the plurality of ply layers are staggered relative to one another in the first and second directions, respectively.

7. The composite grid structure of claim 1, wherein:
the plurality of ply layers are configured to conform to a three-dimensional surface model; and
the three-dimensional surface model is one of a fuselage, a wing structure, or a rocket.

8. The composite grid structure of claim 1, wherein a skin component, comprising a plurality of third elongate tapes oriented in a third direction and a plurality of fourth elongate tapes oriented in a fourth direction, the fourth direction being offset from the third direction by an angle of at least 25 degrees, is positioned adjacent one exterior ply layer of the plurality of ply layers of the grid component.

9. The composite grid structure of claim 8, wherein the skin component is positioned adjacent two opposing exterior ply layers of the plurality of ply layers of the grid component.

10. A composite laminate structure comprising:
a grid component having a plurality of ply layers, each one of the plurality of ply layers comprising a plurality of first elongate tapes oriented in a first direction and a plurality of second elongate tapes oriented in a second direction, the second direction being offset from the first direction by a first angle of at least 20 degrees; and
a skin component, comprising a plurality of third elongate tapes oriented in a third direction and a plurality of fourth elongate tapes oriented in a fourth direction, the fourth direction being offset from the third direction by a second angle of at least 20 degrees, the second angle being different than the first angle,
wherein:
each of the plurality of first elongate tapes in one of the plurality of ply layers has a first length extending between opposing ends of each of the plurality of first elongate tapes and a first midpoint intermediate the opposing ends;
each of the plurality of second elongate tapes in the one of the plurality of ply layers has a second length extending between opposing ends of each of the plurality of second elongate tapes and a second midpoint intermediate the opposing ends;
opposing ends of each one of the plurality of first elongate tapes are positioned adjacent opposite sides of the second midpoint of adjacently positioned ones of the plurality of second elongate tapes to define first joint locations, each of the first joint locations being defined by only two ends of two adjacently positioned ones of the plurality of first elongate tapes and no ends of the plurality of second elongate tapes;
opposing ends of each one of the plurality of second elongate tapes are positioned adjacent opposite sides of the first midpoint of adjacently positioned ones of the plurality of first elongate tapes, so as to define second joint locations, each of the second joint locations being defined by only two ends of two adjacently positioned ones of the plurality of second elongate tapes and no ends of the plurality of first elongate tapes;
each of the first and second elongate tapes has a longitudinal axis extending between the opposing ends of each of the first and second elongate tapes and along the length thereof, the opposing ends of each of the first and second elongate tapes having a semi-circular rounded shape relative to the longitudinal axis of the first and second elongate tapes; and
the skin component is positioned adjacent one exterior ply layer of the plurality of ply layers of the grid component.

11. The composite laminate structure of claim 10, wherein the semi-circular rounded shape is elliptical.

12. The composite laminate structure of claim 10, wherein:
the angle between the first direction and the second direction is between 25 and 70 degrees; and
the angle between the third direction and the fourth direction is between 45 and 85 degrees.

13. The composite laminate structure of claim 10, wherein an aspect ratio between a first length of the plurality of first elongate tapes oriented in the first direction and a second length of the plurality of second elongate tapes oriented in the second direction is in a range from 0.2 to 5.0.

14. The composite laminate structure of claim 10, wherein:
at least one of the first and second lengths is (2L−b), wherein (L) is a size of each grid opening measured from respective first and second midpoints of adjacently positioned ones of the first and second elongate tapes, and wherein (b) is a width of the first and second elongate tapes; and
respective lengths of the third and fourth elongate tapes are the same as that of the first and second elongate tapes.

15. The composite laminate structure of claim 10, wherein the first and second joint locations in a single one of the plurality of ply layers are staggered relative to one another in the first and second directions, respectively.

16. The composite laminate structure of claim 10, wherein the skin component comprises two skin components, respective ones of the two skin components being positioned adjacent two corresponding and opposing exterior ply layers of the plurality of ply layers of the grid component.

17. A grid structure for use in a composite laminate structure, the grid structure comprising:
a single ply layer comprising a set of first elongate tapes oriented in a first direction and a set of second elongate tapes oriented in a second direction, the second direction being offset from the first direction by an angle of at least 25 degrees,
wherein:
each of the first elongate tapes has a first length extending between opposing ends of each of first elongate tapes and a first midpoint intermediate the opposing ends;
each of the second elongate tapes has a second length extending between opposing ends of the second elongate tapes and a second midpoint intermediate the opposing ends;
the first length is the same as the second length;
opposing ends of the first elongate tapes are positioned adjacent opposite sides of the second midpoint of adjacently positioned ones of the second elongate tapes to define first joint locations, each of the first joint locations being defined by only two ends of two adjacently positioned ones of the plurality of first elongate tapes and no ends of the plurality of second elongate tapes;

opposing ends of the second elongate tapes are positioned adjacent opposite sides of the first midpoint of adjacently positioned ones of the first elongate tapes, so as to define second joint locations, each of the second joint locations being defined by only two ends of two adjacently positioned ones of the plurality of second elongate tapes and no ends of the plurality of first elongate tapes; and each of the first and second elongate tapes has a longitudinal axis extending between the opposing ends of each of the first and second elongate tapes and along the length thereof, the opposing ends of each of the first and second elongate tapes having a semi-circular rounded shape relative to the longitudinal axis of the first and second elongate tapes.

18. The grid structure of claim 17, wherein the semi-circular rounded shape is elliptical.

19. A method of manufacturing the composite grid structure of claim 1, the method comprising the steps of:
   forming a first ply layer by dispensing a first set of first elongate tapes oriented in a first direction and a second set of second elongate tapes oriented in a second direction, the second direction being offset from the first direction by an angle of at least 25 degrees, and
   forming a second ply layer by dispensing a third set of first elongate tapes oriented in the first direction and a fourth set of second elongate tapes oriented in the second direction,
   wherein:
      the dispensing is such that opposing ends of each one of the first and third sets of elongate tapes are positioned adjacent opposite sides of the second midpoint of adjacently positioned ones of the second and fourth sets of elongate tapes to define first joint locations; and
      the dispensing is such that opposing ends of each one of the second and fourth sets of elongate tapes are positioned adjacent opposite sides of the first midpoint of adjacently positioned ones of the first and third sets of elongate tapes, so as to define second joint locations in a staggered joint configuration.

20. The method of claim 19, further comprising the step of dispensing a skin component, the skin component comprising set of fifth elongate tapes oriented in a third direction and a set of sixth elongate tapes oriented in a fourth direction, the fourth direction being offset from the third direction by an angle of at least 25 degrees, the fifth and sixth elongate tapes being positioned adjacent at least the second ply layer of the grid component.

21. The method of claim 19, wherein the opposing ends of at least a portion of the first and second elongate tapes are cut, during dispensing, at the semi-circular rounded shape relative to the longitudinal axis of the first and second elongate tapes.

22. The method of claim 21, wherein the semi-circular rounded shape is elliptical.

23. A method of forming the composite laminate structure of claim 10, the method comprising the steps of:
   forming a first ply layer by dispensing a first set of first elongate tapes oriented in a first direction and a second set of second elongate tapes oriented in a second direction, the second direction being offset from the first direction by an angle of at least 25 degrees,
   forming a second ply layer by dispensing a third set of first elongate tapes oriented in the first direction and a fourth set of second elongate tapes oriented in the second direction, and
   forming a skin component comprising set of fifth elongate tapes oriented in a third direction and a set of sixth elongate tapes oriented in a fourth direction, the fourth direction being offset from the third direction by an angle of at least 25 degrees,
   wherein:
      the dispensing is such that opposing ends of each one of the first and third sets of elongate tapes are positioned adjacent opposite sides of the second midpoint of adjacently positioned ones of the second and fourth sets of elongate tapes to define first joint locations;
      the dispensing is such that opposing ends of each one of the second and fourth sets of elongate tapes are positioned adjacent opposite sides of the first midpoint of adjacently positioned ones of the first and third sets of elongate tapes, so as to define second joint locations in a staggered joint configuration; and
      the dispensing is such that the fifth and sixth elongate tapes are positioned adjacent only one or the other of the first and second ply layers defining a skin component adjacent a grid component.

24. The method of claim 23, wherein the opposing ends of at least a portion of the first and second elongate tapes are cut, during dispensing, at the semi-circular rounded shape relative to the longitudinal axis of the first and second elongate tapes.

* * * * *